(12) United States Patent
Gangakhedkar et al.

(10) Patent No.: US 12,167,298 B2
(45) Date of Patent: Dec. 10, 2024

(54) DEVICES AND METHODS FOR DETERMINING A POSITION OF A MOBILE TERMINAL

(71) Applicant: Huawei Technologies Co., Ltd., Shenzhen (CN)

(72) Inventors: Sandip Gangakhedkar, Munich (DE); Qi Wang, Munich (DE); Xitao Gong, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/930,208

(22) Filed: May 12, 2020

(65) Prior Publication Data

US 2020/0275236 A1    Aug. 27, 2020

Related U.S. Application Data

(63) Continuation of application No. PCT/EP2017/079070, filed on Nov. 13, 2017.

(51) Int. Cl.
*H04W 4/02* (2018.01)
*G01S 5/02* (2010.01)
(Continued)

(52) U.S. Cl.
CPC ........... *H04W 4/025* (2013.01); *G01S 5/0226* (2013.01); *G01S 5/0236* (2013.01); *G01S 19/06* (2013.01);
(Continued)

(58) Field of Classification Search
CPC ....... H04W 64/00; H04W 4/02; H04W 4/025; H04W 4/029; H04W 64/003;
(Continued)

(56) References Cited

U.S. PATENT DOCUMENTS

| | | | |
|---|---|---|---|
| 2003/0090418 A1 | 5/2003 | Howell | |
| 2010/0159943 A1* | 6/2010 | Salmon | H04W 4/02 455/456.1 |

(Continued)

FOREIGN PATENT DOCUMENTS

| | | |
|---|---|---|
| CN | 102196558 A | 9/2011 |
| CN | 102958096 A | 3/2013 |
| CN | 107211248 A | 9/2017 |

OTHER PUBLICATIONS

Koivisto et al., "High-Efficiency Device Positioning and Location-Aware Communications in Dense 5G Networks," IEEE Communications Magazine (vol. 55, No. 8), pp. 188-195, Institute of Electrical and Electronics Engineers, New York, New York (Aug. 2017).
(Continued)

*Primary Examiner* — Nam T Huynh
(74) *Attorney, Agent, or Firm* — Leydig, Voit & Mayer, Ltd.

(57) ABSTRACT

The present invention relates to devices and methods for determining a position of a mobile terminal with assistance from a wireless communication system. The mobile terminal is configured to receive a reference signal from a reference point of the wireless communication system, to receive positioning assistance information related to the reference point, and to determine its position based on the positioning assistance information and the reference signal.

18 Claims, 7 Drawing Sheets

(51) Int. Cl.
  *G01S 19/06* (2010.01)
  *G01S 19/25* (2010.01)
  *H04W 64/00* (2009.01)
(52) U.S. Cl.
  CPC ............. *G01S 19/252* (2013.01); *H04W 4/02* (2013.01); *H04W 64/00* (2013.01)
(58) Field of Classification Search
  CPC .... H04W 4/021; G01S 5/0236; G01S 5/0036; G01S 5/0027; G01S 5/0226; G01S 19/06; G01S 19/252
  See application file for complete search history.

(56) References Cited

U.S. PATENT DOCUMENTS

| | | | |
|---|---|---|---|
| 2012/0258733 | A1 | 10/2012 | Fischer et al. |
| 2015/0011238 | A1 | 1/2015 | Tujkovic |
| 2016/0057580 | A1 | 2/2016 | Fischer et al. |
| 2016/0077185 | A1 | 3/2016 | Marshall et al. |
| 2016/0242141 | A1* | 8/2016 | Lin ..................... H04W 64/006 |
| 2017/0208563 | A1 | 7/2017 | Fischer et al. |
| 2018/0217224 | A1* | 8/2018 | Jain ....................... G01S 5/0221 |
| 2018/0324738 | A1* | 11/2018 | Stirling-Gallacher ....................... G01S 5/0036 |
| 2019/0037529 | A1* | 1/2019 | Edge ..................... H04W 16/28 |
| 2019/0086505 | A1* | 3/2019 | Malik ..................... H04L 69/22 |

OTHER PUBLICATIONS

Koivisto et al., "Joint 3D Positioning and Network Synchronization in 5G Ultra-Dense Networks Using UKF and EKF," 2016 IEEE Globecom Workshops (GC Wkshps), Washington, DC, USA, Total 7 pages, Institute of Electrical and Electronics Engineers, New York, New York (Dec. 2016).

Zekavat et al., "Handbook of Position Location—Theory, Practice and Advances," IEEE Press and A John Wiley & Sons, Inc., Total 1255 pages, Institute of Electrical and Electronics Engineers, New York, New York (2012).

Lemic et al., "Localization as a Feature of mmWave Communication," 2016 International Wireless Communications and Mobile Computing Conference (IWCMC), Paphos, Cyprus, pp. 1033-1038, Institute of Electrical and Electronics Engineers, New York, New York (Sep. 2016).

Kela et al., "Location Based Beamforming in 5G Ultra-Dense Networks," 2016 IEEE 84th Vehicular Technology Conference (VTC-Fall), Montreal, QC, Canada, Total 7 pages, Institute of Electrical and Electronics Engineers, New York, New York (Sep. 2016).

"On forming wide beams," 3GPP TSG-RAN WG1 #87ah-NR, Spokane, WA, USA, R1-1700772, pp. 1-4, 3rd Generation Partnership Project, Valbonne, France (Jan. 16-20, 2017).

"WID Update: UE Positioning Accuracy Enhancements for LTE," 3GPP TSG RAN Meeting #76, West Palm Beach, USA, RP-171508 (revision of RP-170813), Total 4 pages, 3rd Generation Partnership Project, Valbonne, France (Jun. 5-8, 2017).

"3rd Generation Partnership Project; Technical Specification Group Services and System Aspects; Feasibility Study on New Services and Markets Technology Enablers; Stage 1 (Release 14)," 3GPP TR 22.891 V14.2.0, pp. 1-95, 3rd Generation Partnership Project, Valbonne, France (Sep. 2016).

Hakkarainen et al., "High-Efficiency Device Localization in 5G Ultra-Dense Networks: Prospects and Enabling Technologies," 2015 IEEE 82nd Vehicular Technology Conference (VTC2015-Fall), Boston, MA, USA, Total 5 pages, Institute of Electrical and Electronics Engineers, New York, New York (Sep. 2015).

"LPP Extensions Specification," Draft Version 1.0—Apr. 19, 2017, Open Mobile Alliance OMA-TS-LPPe-VI_0-20170419-D, total 277 pages (Apr. 19, 2017).

"3rd Generation Partnership Project; Technical Specification Group Radio Access Network; NR; Physical layer procedures for data (Release 15)," 3GPP TS 38.214 V1.0.0, pp. 1-32, 3rd Generation Partnership Project, Valbonne, France (Sep. 2017).

"3rd Generation Partnership Project; Technical Specification Group Radio Access Network; NG Radio Access Network (NG-RAN); NR Positioning Protocol A (NRPPa) (Release 15)," 3GPP TS 38.455 V0.2.0, pp. 1-12, 3rd Generation Partnership Project, Valbonne, France (Oct. 2017).

"3rd Generation Partnership Project; Technical Specification Group Radio Access Network; Evolved Universal Terrestrial Radio Access (E-UTRA); LTE Positioning Protocol (LPP) (Release 14)," 3GPP TS 36.355 V14.3.0, pp. 1-168, 3rd Generation Partnership Project, Valbonne, France (Sep. 2017).

"LPP Extensions Specification," Draft Version 1.0—Apr. 19, 2017, Open Mobile Alliance OMA-TS-LPPe-V1_0-20170419-D, total 277 pages (Apr. 19, 2017).

* cited by examiner

DEVICES AND METHODS FOR DETERMINING A POSITION OF A MOBILE TERMINAL

CROSS-REFERENCE TO RELATED APPLICATIONS

This application is a continuation of International Application No. PCT/EP2017/079070, filed on Nov. 13, 2017, the disclosure of which is hereby incorporated by reference in its entirety.

FIELD OF THE INVENTION

The present invention relates to determining a position of a mobile terminal and especially to devices and methods for determining the position of a mobile terminal with assistance from a wireless communication system.

BACKGROUND

A precise determination of a position (in the literature also called "positioning" or "localization") is an increasingly important requirement for new types of devices and use-cases in fifth generation (5G) cellular networks. In conventional telecommunication networks, there are two main types of high-accuracy positioning techniques: network-based and device-based.

In network-based positioning techniques, the user equipment (UE) location is estimated at the base station (BS) or in a centralized network entity: Network-based positioning usually enables ubiquitous high-accuracy positioning by allowing high computational complexity in the network coverage areas with high energy efficiency (see for example M. Koivisto, et al.: "High-Efficiency Device Localization in 5G Ultra-Dense Networks: Prospects and Enabling Technologies", IEEE Communications Magazine, 2017). It may incur more reporting overhead than device-based positioning methods because the UE needs to feedback measurement reports corresponding to the time-delay estimation, or received signal power, or angle-of-arrival etc.

The network-based positioning techniques can be categorized into angular-based techniques (see for example Koivisto et al: "Joint 3D Positioning and Network Synchronization in 5G Ultra-Dense Networks Using UKF and EKF", GC workshop 2016), received signal strength (RSS) based approaches (see for example SEYED A. (REZA) ZEKAVAT and R.

MICHAEL BUEHRER: "Handbook of Position Location—Theory, Practice and Advances", IEEE press and Wiley), and Time of arrival (TOA) or time difference of arrival (TDOA) based approaches (see for example Lemic et al: "Localization as a feature of mmWave communication", IWCMC 2016).

In angular-based techniques: e.g. angle-of-arrival (AOA) or angle-of-departure (AOD), an estimation of AOD and AOA is performed, and then the position information is deduced using recursive Bayesian estimation, for example using the extended Kalman filter (EKF) or unscented Kalman filter (UKF). In RSS based approaches, an estimation of range information is performed, and then the position is determined using a-priori known positions of the transmitters or from a positioning database containing signal strength to position mappings. These schemes are in general subject to random attenuations, interference or errors. TOA or TDOA based approaches are also employed in conventional Long Term Evolution (LTE)/LTE Advanced (LTE-A) systems. In general, they need cooperation of more than one base station and are subject to synchronization and multipath errors.

In the device-based types, the mobile terminal determines its own position, for example using a global navigation satellite system (GNSS). It is desirable to have less computational complexity at the UE side for positioning estimation. Usually, device-based positioning is performed in a distributed manner, with less reporting overhead. Practical tradeoffs considered in network or device-based positioning mainly involve positioning accuracy performance, complexity, and reporting overhead in terms of number of supporting users.

In fifth generation (5G) cellular networks, myriad device types like drones, sensors, vehicles, robots etc. could be equipped with 5G radio modules acting as mobile terminals. Unlike smartphones, such devices require precise positioning for more critical tasks such as navigation, situation-awareness, path-planning etc. These devices are typically equipped with other sensors like global navigation satellite system (GNSS) receivers, Inertial Measurement Unit (IMU), camera(s) and so on, which help in their positioning.

In order to provide an improved positioning accuracy, network-based positioning is resource-inefficient compared to device-based positioning because network-based positioning requires UE feedback in order to run the positioning algorithms in a network node. The resource overhead due to this UE feedback can get very large, particularly when the positioning requirements are high (with respect to positioning accuracy and/or latency). Furthermore, the computed position has to be signaled to the device on the downlink which further increases the positioning latency and resource overhead. High precise network-centric positioning cannot support massive number of users without congesting the uplink or reducing the reporting frequency which impacts positioning accuracy.

In order to meet challenging positioning requirements for 5G systems with ubiquitous coverage, some state-of-art enablers are envisaged in 5G. Briefly speaking, application of network densification (namely, ultra-dense network (UDN)), use of large frequency band in high frequency spectrum (e.g. mmWave), and employment of massive multiple-input and multiple-output (MIMO). Firstly, network densification increases the probability of line of sight (LOS) connections, thereby consequently reducing the positioning errors caused by non-LOS (NLOS) and multipath errors. Secondly, using large frequency bands available in mmWave spectrum allows for a higher resolution for the estimation of multipath components and propagation delays, rendering it beneficial for more accurate positioning estimation. Combined with large array multi-antenna techniques (for example 64 or 128 antennas), positioning in high frequency can benefit from more accurate angle-based estimation using directional transmissions (e.g., beamforming) with reduced interference, as well as multi-link connectivity.

In location or position based beamforming, the transmitter sends a beamformed signal to a receiver based on apriori information of the receiver's position. Specifically, the transmit beamforming weight vector towards a receiver (e.g. an UE) is designed based on the receiver's position relative to the transmitter. In the case of position-based receive beamforming, the network estimates and tracks the angles needed for designing the receive beamforming vectors. The receive beamforming weight vectors can be calculated in two ways: 1) at the receiver, based on reference signals transmitted by the transmitter; and 2) at the transmitter, based on estimating the AoAs at the receiver and then quantizing and transmitting the receive beamforming weight vectors to the receiver over a control channel. The detailed procedures are described in Kela. P et al.: "Location Based Beamforming in 5G Ultra-Dense Networks", IEEE Vehicular Technology Conference (VTC-Fall), 2016.

Closely related to location based beamforming is the concept of "control beams" which are defined in 3GPP as beams containing control information. These are typically used for initial access, synchronization and location-based signaling (see for example R1-1700772 "On forming wide beams", 3GPP TSG-RAN WG1#87ah-NR Spokane, WA, USA, January 2017).

In US 2003/0090418 A1, an intelligent beamformer for a phased array antenna system is described that constructs and transmits multiple beams simultaneously, each containing encoded data for multiple users using, notably, a single programmable gain and phase control device per antenna element and a single data modulator for the entire system.

SUMMARY

The present disclosure describes devices and methods for determining a position of a mobile terminal in a more accurate manner and/or with fewer resources as compared with the prior art.

According to a first aspect, a mobile terminal for a wireless communication system is provided, the mobile terminal being configured to receive a reference signal from a reference point of the wireless communication system, to receive a positioning assistance information related to the reference point, and to determine a position of the mobile terminal based on the positioning assistance information and the reference signal.

With such a mobile terminal, it is possible, for example, to perform a network-assisted determination of the position of the mobile terminal in a wireless communication system in the mobile terminal itself, i.e. in a device-based manner. In comparison with a fully network-based position determination, network resources may be saved, and the accuracy of the position determination may be improved. Further, the accuracy of the position determination may also be improved with regard to a conventional device-based position determination without assistance of the network, for example using a global navigation satellite system (GNSS).

In an implementation form of the first aspect, the positioning assistance information comprises antenna configuration information of the reference point, and/or geometry-related information of the reference point.

Thereby it is possible, for example, to provide the mobile terminal with information required to determine the position of the mobile terminal from the received reference signal.

In a further implementation form of the first aspect, the antenna configuration information includes an antenna orientation, and/or a beam configuration, and or calibration and/or installation errors of the reference point.

Thereby it is possible, for example, to provide the mobile terminal with information about transmission characteristics of the reference point.

In a further implementation form of the first aspect, the geometry-related information includes a height and/or global coordinates of the reference point.

Thereby it is possible, for example, to provide the mobile terminal with information about the position of the reference point.

In a further implementation form of the first aspect, the positioning assistance information further comprises scheduling-related information, in particular wherein the scheduling-related information comprises transmission subframes and/or update periodicity and/or resource mappings.

Thereby it is possible, for example, to provide the mobile terminal with the information required to correctly interpret the received positioning assistance information.

In a further implementation form of the first aspect, the mobile terminal is further configured to determine angle-related information of the reference signal, and to determine the position of the mobile terminal based on the angle-related information and the positioning assistance information. In particular, the mobile terminal is configured to determine the angle-related information based on an Angle of Departure (AoD) measurement and/or an Angle of Arrival (AoA) measurement.

Thereby it is possible, for example, to determine the position of mobile terminal using geometric relations referring to an angle between the mobile terminal and the reference point, and in particular, to determine the angle-related information using measurement methods known from network-based position determining methods.

In a further implementation form of the first aspect, the mobile terminal is further configured to determine time-related information of the reference signal, and to determine the position of the mobile terminal based on the time-related information and the positioning assistance information. In particular, the mobile terminal is configured to perform a Time of Arrival (TOA) measurement and/or a Time Difference of Arrival (TDOA) measurement for determining the time-related information.

Thereby it is possible, for example, to determine the position of mobile terminal using geometric relations referring to a distance between the mobile terminal and the reference point or to distance differences between the mobile terminal and different reference points, and in particular, to determine the time-related information using measurement methods known from network-based position determining methods.

In a further implementation form of the first aspect, the mobile terminal is further configured to request and/or receive the positioning assistance information from the wireless communication system, in particular a location server.

Thereby it is possible, for example, to transmit the positioning assistance information each time and only when it is really required by the mobile terminal, thus saving network resources.

In a further implementation form of the first aspect, the mobile terminal is further configured to report an information about the determined position to the wireless communication system.

Thereby it is possible, for example, to determine the positioning assistance information to be sent to the mobile terminal based on the determined position of the mobile terminal.

In a further implementation form of the first aspect, the mobile terminal is further configured to determine a coarse position of the mobile terminal without the positioning assistance information and the reference signal, and in particular to determine a region of interest based on the coarse position, and to report an information about the coarse position, in particular the region of interest, to the wireless communication system, wherein the region of interest preferably is based on a distance to at least one further mobile terminal.

Thereby it is possible, for example, to determine the positioning assistance information to be sent to the mobile terminal based on the coarse position of the mobile terminal.

Such a device-based estimation of the coarse position of the mobile terminal may for example be performed using a global navigation satellite system (GNSS). Further, if multiple mobile terminals request positioning assistance information, reporting an information about the coarse position, in particular the region of interest, makes it possible for example to group the mobile terminals into groups having similar positions and/or the same region of interest and to multicast and/or broadcast the positioning assistance information to a plurality of mobile terminals of the same group.

According to the second aspect, a method for operating a mobile terminal for a wireless communication system is provided, the method comprising: receiving a reference signal from a reference point of the wireless communication system, receiving a positioning assistance information related to the reference point, and determining a position of the mobile terminal based on the positioning assistance information and the reference signal.

With such a method, it is possible, for example, to perform a network-assisted determination of the position of the mobile terminal in a wireless communication system in the mobile terminal itself, i.e. in a device-based manner. In comparison with a fully network-based position determination, network resources may be saved, and the accuracy of the position determination may be improved. Further, the accuracy of the position determination may also be improved with regard to a conventional device-based position determination without assistance of the network, for example using a global navigation satellite system (GNSS).

In an implementation form of the second aspect, the positioning assistance information comprises antenna configuration information of the reference point, and/or geometry-related information of the reference point.

Thereby it is possible, for example, to provide the mobile terminal with information required to determine the position of the mobile terminal from the received reference signal.

In a further implementation form of the second aspect, the antenna configuration information includes an antenna orientation, and/or a beam configuration, and or calibration and/or installation errors of the reference point.

Thereby it is possible, for example, to provide the mobile terminal with information about transmission characteristics of the reference point.

In a further implementation form of the second aspect, the geometry-related information includes a height and/or global coordinates of the reference point.

Thereby it is possible, for example, to provide the mobile terminal with information about the position of the reference point.

In a further implementation form of the second aspect, the positioning assistance information further comprises scheduling-related information, in particular wherein the scheduling-related information comprises transmission subframes and/or update periodicity and/or resource mappings.

Thereby it is possible, for example, to provide the mobile terminal with the information required to correctly interpret the received positioning assistance information.

In a further implementation form of the second aspect, the method further comprises determining angle-related information of the reference signal, and determining the position of the mobile terminal based on the angle-related information and the positioning assistance information. In particular, the method comprises determining the angle-related information based on an Angle of Departure (AoD) measurement and/or an Angle of Arrival (AoA) measurement.

Thereby it is possible, for example, to determine the position of mobile terminal using geometric relations referring to an angle between the mobile terminal and the reference point, and in particular, to determine the angle-related information using measurement methods known from network-based position determining methods.

In a further implementation form of the second aspect, the method further comprises determining time-related information of the reference signal and determining the position of the mobile terminal based on the time-related information and the positioning assistance information. In particular, the method comprises performing a Time of Arrival (TOA) measurement and/or a Time Difference of Arrival (TDOA) measurement for determining the time-related information.

Thereby it is possible, for example, to determine the position of mobile terminal using geometric relations referring to a distance between the mobile terminal and the reference point or to distance differences between the mobile terminal and different reference points, and in particular, to determine the time-related information using measurement methods known from network-based position determining methods.

In a further implementation form of the second aspect, the method further comprises requesting and/or receiving the positioning assistance information from the wireless communication system, in particular a location server.

Thereby it is possible, for example, to transmit the positioning assistance information each time and only when it is really required by the mobile terminal, thus saving network resources.

In a further implementation form of the second aspect, the method further comprises reporting an information about the determined position to the wireless communication system.

Thereby it is possible, for example, to determine the positioning assistance information to be sent to the mobile terminal based on the determined position of the mobile terminal.

In a further implementation form of the second aspect, the method further comprises determining a coarse position of the mobile terminal without the positioning assistance information and the reference signal, and in particular determining a region of interest based on the coarse position, and reporting an information about the coarse position, in particular the region of interest, to the wireless communication system, wherein the region of interest preferably is based on a distance to at least one further mobile terminal.

Thereby it is possible, for example, to determine the positioning assistance information to be sent to the mobile terminal based on the coarse position of the mobile terminal. Such a device-based estimation of the coarse position of the mobile terminal may for example be performed using a global navigation satellite system (GNSS). Further, if multiple mobile terminals request positioning assistance information, reporting an information about the coarse position, in particular the region of interest, makes it possible for example to group the mobile terminals into groups having similar positions and/or the same region of interest and to multicast and/or broadcast the positioning assistance information to a plurality of mobile terminals of the same group.

According to the third aspect, a location server for a wireless communication system is provided, the location server being configured to determine a positioning assistance information to be sent to a mobile terminal in order to enable the mobile terminal to determine a position of the mobile terminal based on the received positioning assistance information and a reference signal received from a reference point of the wireless communication system, the positioning assistance information being related to the reference point.

With such a location server, it is possible, for example, to enable a network-assisted determination of the position of the mobile terminal in a wireless communication system in the mobile terminal itself, i.e. in a device-based manner. In comparison with a fully network-based position determination, network resources may be saved, and the accuracy of the position determination may be improved. Further, the accuracy of the position determination may also be improved with regard to a conventional device-based position determination without assistance of the network, for example using a global navigation satellite system (GNSS).

In an implementation form of the third aspect, the positioning assistance information comprises antenna configuration information of the reference point, and/or geometry-related information of the reference point.

Thereby it is possible, for example, to provide the mobile terminal with information required to determine the position of the mobile terminal from the received reference signal.

In a further implementation form of the third aspect, the antenna configuration information includes an antenna orientation, and/or a beam configuration, and or calibration and/or installation errors of the reference point.

Thereby it is possible, for example, to provide the mobile terminal with information about transmission characteristics of the reference point.

In a further implementation form of the third aspect, the geometry-related information includes a height and/or global coordinates of the reference point.

Thereby it is possible, for example, to provide the mobile terminal with information about the position of the reference point.

In a further implementation form of the third aspect, the positioning assistance information further comprises scheduling-related information, in particular wherein the scheduling-related information comprises transmission subframes and/or update periodicity and/or resource mappings.

Thereby it is possible, for example, to provide the mobile terminal with the information required to correctly interpret the received positioning assistance information.

In a further implementation form of the third aspect, the location server is further configured to determine the positioning assistance information for the mobile terminal and/or an updating period of the positioning assistance information based on a request of the mobile terminal and/or based on an estimated coarse position of the mobile terminal and/or based on a determined position of the mobile terminal and/or based on an expected trajectory of the mobile terminal.

Thereby it is possible, for example, to adapt the positioning assistance information to be sent to the mobile terminal to the estimated or determined position and/or a movement of the mobile terminal.

In a further implementation form of the third aspect, the location server is further configured to request assistance information from a transmitter transmitting the positioning assistance information and/or from one or more reference point(s) transmitting one or more reference signal(s), to receive the assistance information from the transmitter and/or the reference point(s), and to determine the positioning assistance information for the mobile terminal based on the received assistance information.

Thereby it is possible, for example, to include such information obtained from a transmitter or reference point into the positioning assistance information to be sent to the mobile terminal.

In a further implementation form of the third aspect, the location server is further configured to group a number of mobile terminals according to their coarse position into groups and to determine, for each group separately, the same positioning assistance information, preferably positioning assistance information relating to the same reference points, to be multicast to the mobile terminals comprised in the corresponding group. Preferably, the location server is further configured to change the assignment of the mobile terminals to the groups when the mobile terminals have changed their position.

Thereby it is possible, for example, to determine and multicast the same positioning assistance information to a number of mobile terminals which are arranged in the same region of interest, i.e. in a region served by the same reference points, thus saving resources.

According to the fourth aspect, a method for operating a location server for a wireless communication system is provided, the method comprising: determining a positioning assistance information to be sent to a mobile terminal in order to enable the mobile terminal to determine a position of the mobile terminal based on the received positioning assistance information and a reference signal received from a reference point of the wireless communication system, wherein the positioning assistance information is related to the reference point.

With such a method, it is possible, for example, to enable a network-assisted determination of the position of the mobile terminal in a wireless communication system in the mobile terminal itself, i.e. in a device-based manner. In comparison with a fully network-based position determination, network resources may be saved, and the accuracy of the position determination may be improved. Further, the accuracy of the position determination may also be improved with regard to a conventional device-based position determination without assistance of the network, for example using a global navigation satellite system (GNSS).

In an implementation form of the fourth aspect, the positioning assistance information comprises antenna configuration information of the reference point, and/or geometry-related information of the reference point.

Thereby it is possible, for example, to provide the mobile terminal with information required to determine the position of the mobile terminal from the received reference signal.

In a further implementation form of the fourth aspect, the antenna configuration information includes an antenna orientation, and/or a beam configuration, and or calibration and/or installation errors of the reference point.

Thereby it is possible, for example, to provide the mobile terminal with information about transmission characteristics of the reference point.

In a further implementation form of the fourth aspect, the geometry-related information includes a height and/or global coordinates of the reference point.

Thereby it is possible, for example, to provide the mobile terminal with information about the position of the reference point.

In a further implementation form of the fourth aspect, the positioning assistance information further comprises scheduling-related information, in particular wherein the scheduling-related information comprises transmission subframes and/or update periodicity and/or resource mappings.

Thereby it is possible, for example, to provide the mobile terminal with the information required to correctly interpret the received positioning assistance information.

In a further implementation form of the fourth aspect, the method further comprises determining the positioning assistance information for the mobile terminal and/or an updating period of the positioning assistance information based on a request of the mobile terminal and/or based on an estimated coarse position of the mobile terminal and/or based on a determined position of the mobile terminal and/or based on an expected trajectory of the mobile terminal.

Thereby it is possible, for example, to adapt the positioning assistance information to be sent to the mobile terminal to the estimated or determined position and/or a movement of the mobile terminal.

In a further implementation form of the fourth aspect, the method further comprises requesting assistance information from a transmitter transmitting the positioning assistance information and/or from one or more reference point(s) transmitting one or more reference signal(s), receiving the assistance information from the transmitter and/or the reference point(s), and determining the positioning assistance information for the mobile terminal based on the received assistance information.

Thereby it is possible, for example, to include such information obtained from a transmitter or reference point into the positioning assistance information to be sent to the mobile terminal.

In a further implementation form of the fourth aspect, the method further comprises grouping a number of mobile terminals according to their coarse position into groups and to determining, for each group separately, the same positioning assistance information, preferably positioning assistance information relating to the same reference points, to be multicast to the mobile terminals comprised in the corresponding group. Preferably, the method further comprises changing the assignment of the mobile terminals to the groups when the mobile terminals have changed their position.

Thereby it is possible, for example, to determine and multicast the same positioning assistance information to a number of mobile terminals which are arranged in the same region of interest, i.e. in a region served by the same reference points, thus saving resources.

According to the fifth aspect, a base station for a wireless communication system is provided, the base station being configured to receive a positioning assistance information to be sent to a mobile terminal in order to enable the mobile terminal to determine a position of the mobile terminal based on the received positioning assistance information and a reference signal received from a reference point of the wireless communication system, and to transmit the positioning assistance information to the mobile terminal, wherein the positioning assistance information is related to the reference point.

With such a base station, it is possible, for example, to enable a network-assisted determination of the position of the mobile terminal in a wireless communication system in the mobile terminal itself, i.e. in a device-based manner. In comparison with a fully network-based position determination, network resources may be saved, and the accuracy of the position determination may be improved. Further, the accuracy of the position determination may also be improved with regard to a conventional device-based position determination without assistance of the network, for example using a global navigation satellite system (GNSS).

In an implementation form of the fifth aspect, the positioning assistance information comprises antenna configuration information of the reference point, and/or geometry-related information of the reference point.

Thereby it is possible, for example, to provide the mobile terminal with information required to determine the position of the mobile terminal from the received reference signal.

In a further implementation form of the fifth aspect, the antenna configuration information includes an antenna orientation, and/or a beam configuration, and or calibration and/or installation errors of the reference point.

Thereby it is possible, for example, to provide the mobile terminal with information about transmission characteristics of the reference point.

In a further implementation form of the fifth aspect, the geometry-related information includes a height and/or global coordinates of the reference point.

Thereby it is possible, for example, to provide the mobile terminal with information about the position of the reference point.

In a further implementation form of the fifth aspect, the positioning assistance information further comprises scheduling-related information, in particular wherein the scheduling-related information comprises transmission subframes and/or update periodicity and/or resource mappings.

Thereby it is possible, for example, to provide the mobile terminal with the information required to correctly interpret the received positioning assistance information.

In a further implementation form of the fifth aspect, the base station is further configured to receive a request for assistance information from the mobile terminal, and/or to forward the request for assistance information to a location server.

Thereby it is possible, for example, to efficiently answer a request for assistance information from the mobile terminal.

In a further implementation form of the fifth aspect, the base station is further configured to transmit the reference signal.

Thereby it is possible, for example, to use the base station itself as a reference point for transmitting the reference signal.

In a further implementation form of the fifth aspect, the base station is further configured to broadcast the positioning assistance information to multiple mobile terminals within one or more Region(s) of Interest RoI, and/or to multicast the positioning assistance information to multiple mobile terminals, and/or to unicast the positioning assistance information to a single mobile terminal.

Thereby it is possible, for example, to provide alternative transmission schemes by which the positioning assistance information is sent to one or more mobile terminal(s).

In a further implementation form of the fifth aspect, the base station is further configured to transmit the positioning assistance information using beamforming that is based on at least one of a coarse position of a mobile terminal, a region of interest, and/or a content of the positioning assistance information.

Thereby it is possible, for example, to adapt the transmission of the positioning assistance information to the actual situation.

According to the sixth aspect, a method for operating a base station for a wireless communication system is provided, the method comprising: receiving a positioning assistance information to be sent to a mobile terminal in order to enable the mobile terminal to determine a position of the mobile terminal based on the received positioning assistance information and a reference signal received from a reference point of the wireless communication system, and transmitting the positioning assistance information to the mobile terminal, wherein the positioning assistance information is related to the reference point.

With such a method, it is possible, for example, to enable a network-assisted determination of the position of the mobile terminal in a wireless communication system in the mobile terminal itself, i.e. in a device-based manner. In comparison with a fully network-based position determination, network resources may be saved, and the accuracy of the position determination may be improved. Further, the accuracy of the position determination may also be improved with regard to a conventional device-based position determination without assistance of the network, for example using a global navigation satellite system GNSS.

In an implementation form of the sixth aspect, the positioning assistance information comprises antenna configuration information of the reference point, and/or geometry-related information of the reference point.

Thereby it is possible, for example, to provide the mobile terminal with information required to determine the position of the mobile terminal from the received reference signal.

In a further implementation form of the sixth aspect, the antenna configuration information includes an antenna orientation, and/or a beam configuration, and or calibration and/or installation errors of the reference point.

Thereby it is possible, for example, to provide the mobile terminal with information about transmission characteristics of the reference point.

In a further implementation form of the sixth aspect, the geometry-related information includes a height and/or global coordinates of the reference point.

Thereby it is possible, for example, to provide the mobile terminal with information about the position of the reference point.

In a further implementation form of the sixth aspect, the positioning assistance information further comprises scheduling-related information, in particular wherein the scheduling-related information comprises transmission sub-frames and/or update periodicity and/or resource mappings.

Thereby it is possible, for example, to provide the mobile terminal with the information required to correctly interpret the received positioning assistance information.

In a further implementation form of the sixth aspect, the method further comprises receiving a request for assistance information from the mobile terminal, and/or to forward the request for assistance information to a location server.

Thereby it is possible, for example, to efficiently answer a request for assistance information from the mobile terminal.

In a further implementation form of the sixth aspect, the method further comprises transmitting the reference signal from the base station.

Thereby it is possible, for example, to use the base station itself as a reference point for transmitting the reference signal.

In a further implementation form of the sixth aspect, the method further comprises broadcasting the positioning assistance information to multiple of mobile terminals within one or more Region(s) of Interest (RoI), and/or to multicast the positioning assistance information to multiple mobile terminals, and/or to unicast the positioning assistance information to a single mobile terminal.

Thereby it is possible, for example, to provide alternative transmission schemes by which the positioning assistance information is sent to one or more mobile terminal(s).

In a further implementation form of the sixth aspect, the method further comprises transmitting the positioning assistance information using beamforming that is based on at least one of a coarse position of a mobile terminal, a region of interest, and/or a content of the positioning assistance information.

Thereby it is possible, for example, to adapt the transmission of the positioning assistance information to the actual situation.

According to the seventh aspect, a wireless communication system is provided comprising a location server according to the third aspect as such or according to any of the implementation forms of the third aspect, and a base station according to the fifth aspect as such or according to any of the implementation forms of the fifth aspect.

With such a wireless communication system, it is possible, for example, to enable a network-assisted determination of the position of the mobile terminal in a wireless communication system in the mobile terminal itself, i.e. in a device-based manner. In comparison with a fully network-based position determination, network resources may be saved, and the accuracy of the position determination may be improved. Further, the accuracy of the position determination may also be improved with regard to a conventional device-based position determination without assistance of the network, for example using a global navigation satellite system (GNSS).

In an implementation form of the seventh aspect, the wireless communication further comprises one or more reference point(s), each configured to transmit one or more reference signal(s).

Thereby it is possible, for example, to provide alternative solutions in which way the reference signal or signals is or are sent to the mobile terminal. A reference point different from the base station is for example advantageous in a case in which the base station is a low-frequency base station in the frequency range below 6 GHz which may cover a large area, but offers a reduced positioning accuracy, and the reference point is a high-frequency access point in the frequency range above 6 GHz which can only serve mobile terminals in a line-of-sight connection, but offers a higher positioning accuracy.

In a further implementation form of the seventh aspect, the wireless communication system is further configured to estimate a coarse position of the mobile terminal.

Thereby it is possible, for example, to determine the positioning assistance information to be sent to the mobile terminal based on the coarse position of the mobile terminal. Such a network-based estimation of the coarse position of the mobile terminal may for example be performed using a wireless location technology such as for example Observed Time Difference Of Arrival (OTDoA) or Uplink-Time Difference of Arrival (UTDoA).

According to the eighth aspect, a method for determining a position of a mobile terminal with the assistance of a wireless communication system is provided, the method comprising: transmitting a reference signal from a reference point to the mobile terminal, determining a positioning assistance information related to the reference point for the mobile terminal, transmitting the positioning assistance information to the mobile terminal, determining, in the mobile terminal, the position of the mobile terminal based on the positioning assistance information and the reference signal received by the mobile terminal.

With such a method, it is possible, for example, to perform a network-assisted determination of the position of the mobile terminal in a wireless communication system in the mobile terminal itself, i.e. in a device-based manner. In comparison with a fully network-based position determination, network resources may be saved, and the accuracy of the position determination may be improved. Further, the accuracy of the position determination may also be improved with regard to a conventional device-based position determination without assistance of the network, for example using a global navigation satellite system (GNSS).

In an implementation form of the eighth aspect, the positioning assistance information comprises antenna configuration information of the reference point, and/or geometry-related information of the reference point.

Thereby it is possible, for example, to provide the mobile terminal with information required to determine the position of the mobile terminal from the received reference signal.

In a further implementation form of the eighth aspect, the antenna configuration information includes an antenna orientation, and/or a beam configuration, and or calibration and/or installation errors of the reference point.

Thereby it is possible, for example, to provide the mobile terminal with information about transmission characteristics of the reference point.

In a further implementation form of the eighth aspect, the geometry-related information includes a height and/or global coordinates of the reference point.

Thereby it is possible, for example, to provide the mobile terminal with information about the position of the reference point.

In a further implementation form of the eighth aspect, the positioning assistance information further comprises scheduling-related information, in particular wherein the scheduling-related information comprises transmission subframes and/or update periodicity and/or resource mappings.

Thereby it is possible, for example, to provide the mobile terminal with the information required to correctly interpret the received positioning assistance information.

In a further implementation form of the eighth aspect, the method further comprises determining angle-related information of the reference signal, and determining the position of the mobile terminal based on the angle-related information and the positioning assistance information. In particular, the method comprises determining the angle-related information based on an Angle of Departure (AoD) measurement and/or an Angle of Arrival (AoA) measurement.

Thereby it is possible, for example, to determine the position of mobile terminal using geometric relations referring to an angle between the mobile terminal and the reference point, and in particular, to determine the angle-related information using measurement methods known from network-based position determining methods.

In a further implementation form of the eighth aspect, the method further comprises determining time-related information of the reference signal and determining the position of the mobile terminal based on the time-related information and the positioning assistance information. In particular, the method comprises performing a Time of Arrival (TOA) measurement and/or a Time Difference of Arrival (TDOA) measurement for determining the time-related information.

Thereby it is possible, for example, to determine the position of mobile terminal using geometric relations referring to a distance between the mobile terminal and the reference point or to distance differences between the mobile terminal and different reference points, and in particular, to determine the time-related information using measurement methods known from network-based position determining methods.

In a further implementation form of the eighth aspect, the method further comprises requesting and/or receiving the positioning assistance information from the wireless communication system, in particular a location server.

Thereby it is possible, for example, to transmit the positioning assistance information each time and only when it is really required by the mobile terminal, thus saving network resources.

In a further implementation form of the eighth aspect, the method further comprises reporting an information about the determined position to the wireless communication system.

Thereby it is possible, for example, to determine the positioning assistance information to be sent to the mobile terminal based on the determined position of the mobile terminal.

In a further implementation form of the eighth aspect, the method further comprises determining a coarse position of the mobile terminal without the positioning assistance information and the reference signal, and in particular determining a region of interest based on the coarse position, and reporting an information about the coarse position, in particular the region of interest, to the wireless communication system, wherein the region of interest preferably is based on a distance to at least one further mobile terminal.

Thereby it is possible, for example, to determine the positioning assistance information to be sent to the mobile terminal based on the coarse position of the mobile terminal. Such a device-based estimation of the coarse position of the mobile terminal may for example be performed using a global navigation satellite system (GNSS).

According to the ninth aspect, a computer program is provided with a program code for performing a method according to the second, fourth, sixth, or seventh aspect or any one of the implementation forms of these aspects when the program runs on a computing device.

Thereby, it is possible to perform the methods software-controlled on a computing device. Furthermore, the method can be performed in an automatic and repeatable manner.

More specifically, it should be noted that all the above devices and apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the Internet.

It shall further be understood that a preferred embodiment of the invention can also be any combination of the dependent claims or above embodiments with the respective independent claims.

These and other aspects of the invention will be apparent and elucidated with reference to the embodiments described hereinafter.

DETAILED DESCRIPTION

In the following, embodiments are described with reference to the enclosed figures.

Figure 1:
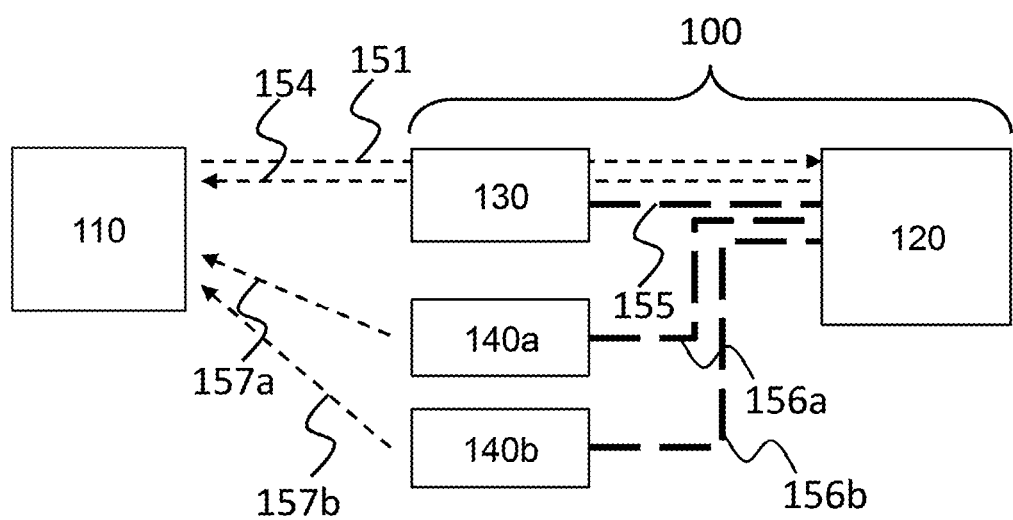
FIG. 1 is a schematic block diagram showing a wireless communication system and a mobile terminal according to an embodiment.

FIG. 1 is a schematic block diagram showing a general scheme of a wireless communication system 100 and a mobile terminal 110 according to an embodiment.

The mobile terminal 110 may be an user equipment (UE) such as a mobile phone used by a user, or any radio module able to send and receive signals to the or from the wireless communication system 100. Such a radio module acting as a mobile terminal may for example be provided at a sensor, a machine, a robot, a vehicle, a drone or the like. The mobile terminal 110 is configured to send a request 151 for positioning assistance information to the wireless communication system 100 and to receive the positioning assistance information 154 from the system.

The communication system 100 comprises a location server 120. The location server may be a dedicated server for the purpose of localization, or be implemented on another server comprised in the communication system 100. The functionality of the location server 120 may also be distributed over more than one server comprised in the communication system 100. In the following, the term "location server" designates the functional unit provided in the communication system 100 for the purpose of localization.

The wireless communication system 100 further comprises a base station 130 and one or more reference points 140a, 140b. The base 130 station is a transmitter/receiver capable to communicate with the mobile terminal 110. It may for example be a base station for any conventional or future network standard such as a base transceiver station for the Global System for Mobile Communications (GSM), a nodeB for the Universal Mobile Telecommunications System (UMTS), an enodeB for LTE or the like. The reference points 140a, 140b are transmitters capable to send reference signals 157a, 157b to the mobile terminal 110. As an example, two reference points 140a, 140b are shown in FIG. 1, but the present invention is not limited thereto. Any suited number of reference points may be provided. On the other hand, the base station 130 itself may act as a reference point sending a reference signal so that no additional reference point is required.

As an example, a heterogeneous network is considered wherein the base station 130 is a low-frequency base station operating in a low frequency range (LF) below 6 GHz, while the reference points are high-frequency transmitters operating in a high frequency range (HF) above 6 GHz. In this case, the mobile terminal 110 has to be suited for multi-link connectivity (LF/HF). The HF reference points may be HF base stations, millimeter wave transmit receive points (mm-Wave TRP), HF access points (AP), UE anchors or the like. However, the present invention is not restricted to the above example. The base station 130 may also be a HF base station, and/or the reference points may be LF base stations, transmit receive points and/or access points.

The access points and/or UE anchors might, for example, change their position, antenna orientation and configuration in order to better support the localization. Such changes must then be updated and shared by the wireless communication system in real-time in order to ensure that the positioning assistance information is always updated.

The mobile terminal 110 is configured to determine its position with assistance from the wireless communication system 100. For this purpose, it sends a request 151 for positioning assistance information to the wireless communication system 100. The request 151 is received by the base station 130 and forwarded to the location server 120.

The location server 120 determines a positioning assistance information 154 to be sent to the mobile terminal 110. This positioning assistance information is related to the reference point(s) 140a, 140b which is or are intended to transmit a reference signal 157a, 157b to the mobile terminal 110. This positioning assistance information may comprise antenna configuration information of the reference point and/or and geometry-related information of the reference point and/or scheduling-related information.

The antenna configuration information may include an antenna orientation, and/or a beam configuration, and/or calibration and/or installation errors of the reference point. The antenna orientation may be given by an elevation angle or a downtilt angle, for example 0-10° in steps of 0.5°, and/or an azimuth angle, for example 0-180° in steps of 0.5°. The beam configuration may be given by the number of beams per antenna port and/or the beamwidth or angular spread, for example at 3 dB, 10 dB etc., and/or the Angle of Departure (AoD) with respect to the local coordinate system of the reference point and/or the beam ID to antenna port mapping and or the beam ID to AoD mapping. The calibration and/or installation errors may be given by a calibration mismatch, for example in the range from −0.5° to 0.5°, and/or an installation mismatch, for example in the range from −0.6° to 0.6°.

The geometry-related information may include a height, and/or global position coordinates, and/or an estimated error in the global position coordinates of an antenna or an antenna array, for example a 2D antenna array, of the reference point. The height of the antenna or antenna array may be given in m or cm. The global position coordinates of the antenna or antenna array may be given as longitude and latitude. They may for example be coordinates obtained via a global navigation satellite system (GNSS). The estimated error in the global position coordinates may be given as a variance of GNSS position coordinates and/or as an estimated positioning error (EPE) of a GNSS receiver.

The scheduling-related information may include transmission subframes and/or a periodicity of transmission and/or resource mappings. The transmission subframes and periodicity may for example be given as $(10 \times n_f + [n_s/2] - \Delta_{PRS}) \mod T_{PRS} = 0$, wherein $n_s$ is the system frame number, $n_f$ is the slot number within the radio frame, $\Delta_{PRS}$ is the subframe offset within the periodicity $T_{PRS}$ of the positioning reference signals (PRS). The resource mappings may for example be given as indices of the resource elements and/or resource blocks and/or orthogonal frequency-division multiplexing (OFDM) symbols containing the reference signals.

For determining the content of the positioning assistance information (PAI) 154, the location server 120 may, for instance, take into account a coarse location and/or moving trajectory of the requesting mobile terminal 110. The location server may request up-to-date assistance information 155, 156a, 156b from the relevant reference points 130 (if the base station acts as a reference point), 140a, 140b. The location server 120 may further determine how frequently such a PAI needs to be updated.

The location server 120 may also determine a transmission scheme for transmitting the positioning assistance information 154 from the base station 130 to the mobile terminal(s) 110, for example taking into account the coarse location and/or moving trajectory and/or the number and/or distribution of the requesting mobile terminal(s) 110. Alternately, the corresponding decision may also be made by the base station 130 itself.

Examples of transmission schemes for the PAI may include, among others:
- Broadcasting the PAI to multiple mobile terminals, if for instance, high accuracy positioning is a required service within a Region of Interest (RoI);
- Multicasting the PAI to multiple mobile terminals, if for instance, multiple mobile terminals within the RoI send a request for positioning assistance information;
- Unicasting the PAI to a single mobile terminal, if a specific positioning assistance information is requested by a single mobile terminal or mobility tracking is required.

The serving base station, usually a LF-base station, may transmit the PAI with a widebeam in order to cover the RoI. The base station may also transmit the PAI using beamforming that is based on at least one of a coarse position of a mobile terminal, a ROI, a content of the PAI. By joint and/or separated beam sweeping, PAI may be transmitted together with other system information. A single frequency network may be used where all the base stations (preferably HF base stations) within the RoI send the PAI in a certain time slot.

Finally, the location server 120 transmits the PAI to the base station 130 which forwards the PAI 154 to the mobile terminals 110 according to a transmission scheme as described above. Further, each of the involved reference points sends a reference signal 157a, 157b.

The mobile terminal receives the positioning assistance information 154 and the reference signal(s) 157a, 157b. It then determines, in a device based manner, the position of the mobile terminal 110 based on the received positioning assistance information 154 and the received reference signal signal(s) 157a, 157b. It may then provide position information back to the wireless communication system 100, preferably to the location server 120. The position information may consist of the determined position of the mobile terminal 110 and the estimation quality.

The mobile terminal 110 may for example determine angle-related information of the reference signal 157a, 157b, and then determine its position based on the angle-related information and the positioning assistance information 154. In particular, the mobile terminal may determine the angle-related information based on an Angle of Departure (AoD) measurement and/or an Angle of Arrival (AoA) measurement.

Additionally or alternatively, the mobile terminal 110 may for example determine time-related information of the reference signal 157a, 157b, and then determine its position based on the time-related information and the positioning assistance information 154. In particular, the mobile terminal may perform a Time of Arrival (TOA) measurement and/or a Time Difference of Arrival (TDOA) measurement for determining the time-related information.

Any other known method for determining the position from the reference signals may be used.

With the devices and methods described above, it is possible, for example, to perform a network-assisted determination of the position of the mobile terminal in a wireless communication system in the mobile terminal itself, i.e. in a device-based manner, but in a network-enabled manner. In comparison with a fully network-based position determination, network resources may be saved, and the accuracy of the position determination may be improved. Further, the accuracy of the position determination may also be improved with regard to a conventional device-based position determination without assistance of the network, for example using a global navigation satellite system (GNSS).

The role of the wireless communication system is to provide precise positioning as-a-service which is a type of network-enabled device-based positioning: It relies on the network to provide positioning assistance information (network-enabled) to certain types of mobile terminal, which in turn use this information to estimate their own position locally (device-based). From a resource utilization point of view, the proposed positioning service is highly resource efficient. Several new use cases and applications are naturally suited for this type of network-enabled device-based positioning, for example drone navigation, robot localization etc.

In the following, embodiments are described which relate to different scenarios or implementation examples to which the general scheme of the invention as described above with reference to FIG. 1 can be applied. The embodiments are described under the context of a dual connectivity scenario where below-6 GHz base stations (LF BS) and mmWave transmit receive points (TRPs) are involved. Due to the propagation characteristics of the mmWave band signal, the signal tends to arrive from a line-of-sight path. This to some extent simplifies the positioning. However, the PAI transmission procedure described in the embodiments can be applied to other multi-link scenarios, such as heterogeneous network consisting of small cells and macro BSs.

FIGS. 2a to 2d show steps of a method for determining a position of the mobile terminal with the assistance of the wireless communication system according to an embodiment, wherein mmWave positioning is enabled by conventional cellular positioning.

Since mmWave TRPs allow higher bandwidth usage and deployment of large 2D antenna array, they offer great potential for improving positioning accuracy. However, due to the limited coverage and sensitivity to blockage, dual connectivity to a low frequency base station (LF BS) such as an eNodeB is usually recommended. In this embodiment, the positioning procedure is described using the mmWave TRPs as reference points.

Figure 2A:
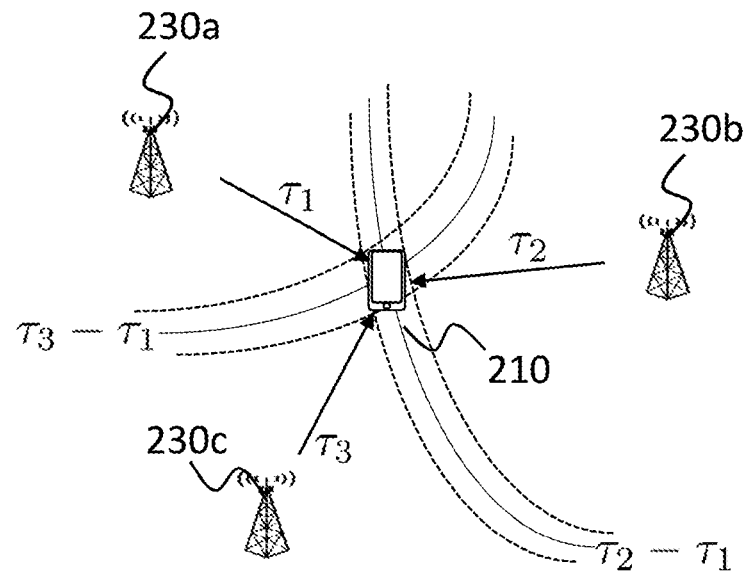
FIGS. 2a to 2d show steps of a method for determining a position of the mobile terminal with the assistance of the wireless communication system according to an embodiment.

A first step is shown in FIG. 2a. The mobile terminal 210 may estimate its position using conventional positioning techniques, e.g. GNSS. This coarse estimation is then reported to the network where the RoI can be determined. As an alternative, the coarse positioning estimation can also be done on the network side using a Observed Time Difference Of Arrival (OTDoA) and/or a Uplink-Time Difference of Arrival (UTDoA) measurement. This is indicated in FIG. 2a by time differences $\tau_1$, $\tau_2$, $\tau_3$ with regard to three LF BSs 230a, 230b, 230c. In this case, the position reporting is not necessary since the position is determined in the network itself.

Figure 2B:
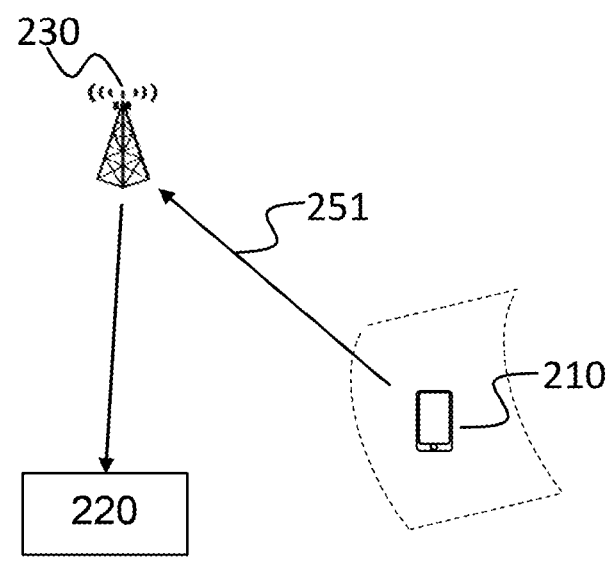

A second step is shown in FIG. 2b. In the case that high accuracy positioning enhancement is desired, the mobile terminal 210 sends a request 251 for PAI which is received by the base station 230 and forwarded to the location server 220.

Figure 2C:
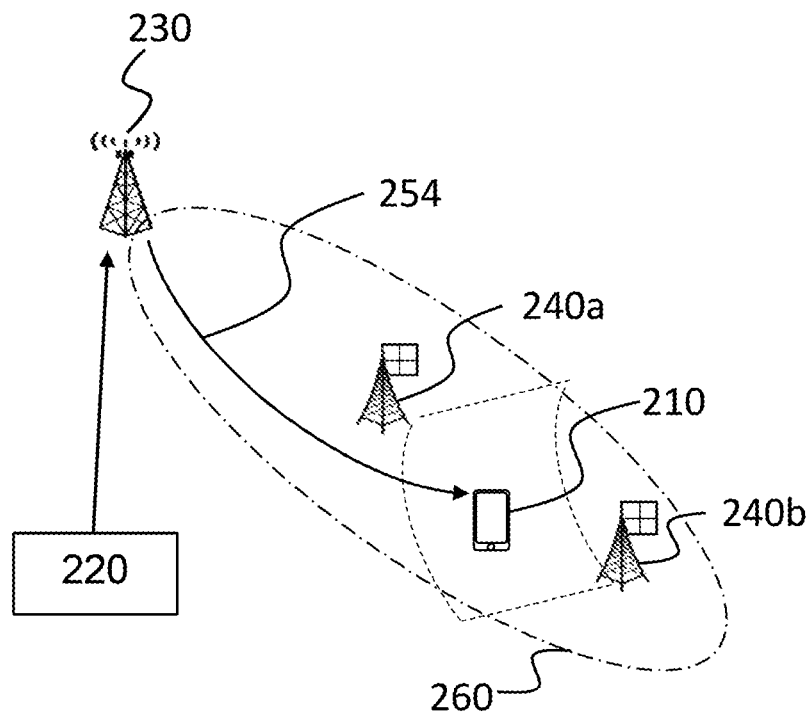

A third step is shown in FIG. 2c. Based on the RoI 260 determined in step 1, the location server 220 obtains the up-to-date configuration of the relevant mmWave TRPs, namely the reference points 240a and 240b. This information is conveyed as a PAI 254 to the requesting mobile terminal 210 via the base station 230 which is a LF eNodeB which has a broad coverage.

Figure 2D:
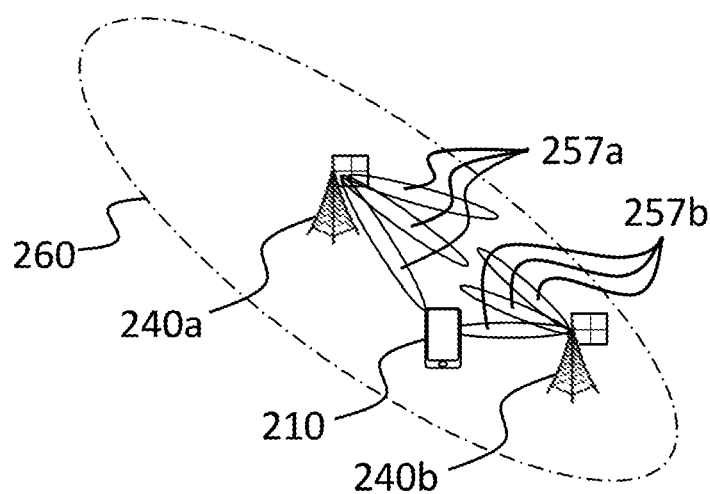

A fourth step is shown in FIG. 2d. The reference points 240a and 240b send reference signals 257a, 257b to the mobile terminal 210. Based on the received reference signals 257a, 257b and the received PAI 254, the mobile terminal 210 determines its position in the global coordinates using for example, an AoD and/or AoA measurement as described above.

Figure 3A:
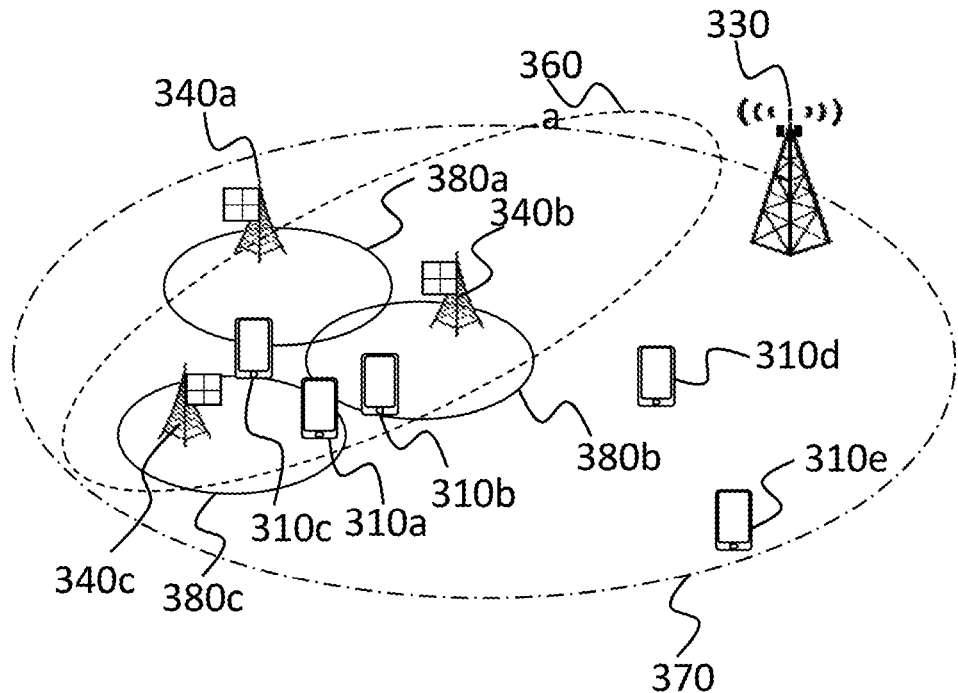
FIGS. 3a and 3b show alternate scenarios for determining a position of the mobile terminal with the assistance of the wireless communication system according to an embodiment.
Figure 3B:
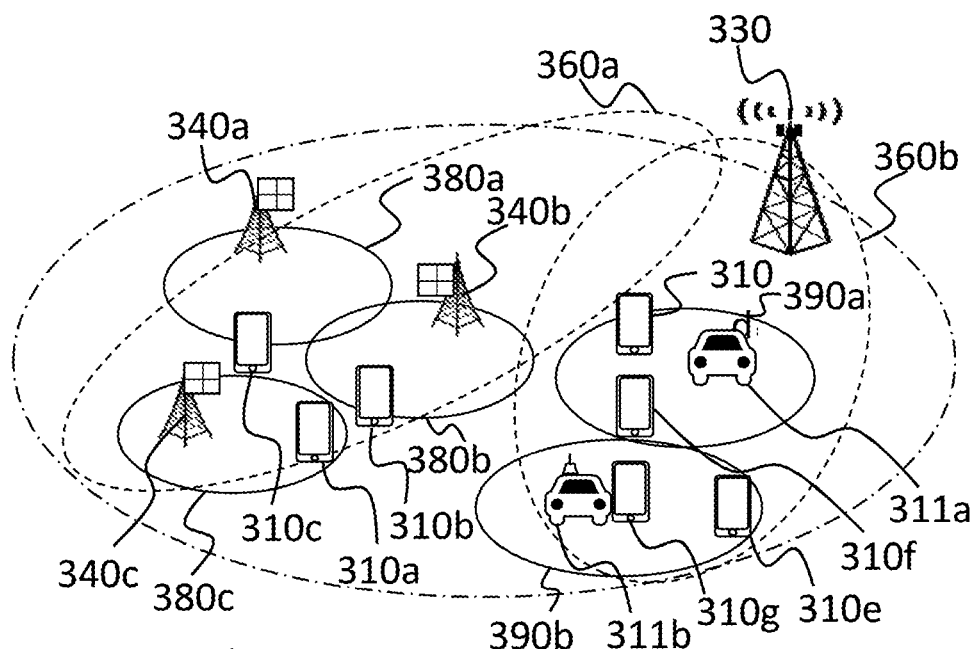

FIGS. 3a and 3b show alternate scenarios for a method for determining a position of the mobile terminal with the assistance of the wireless communication system according to an embodiment of the invention, wherein positioning assistance information is transmitted under network-induced updates. Although the antenna/beam configuration and physical parameters of the reference points are typically static, the PAI sometimes needs to be updated.

FIG. 3a shows a scenario example similar to the one shown in FIG. 2b. An LF base station 330 having an LF coverage area 370 and three mmW TRPs as reference points 340a, 340b, 340c, each having a mmW coverage area 380a, 380b, 380c, are provided. Further, multiple mobile terminals are provided. Mobile terminal 310a is the one with a high accuracy positioning request. A first RoI 360a is determined for this mobile terminal 310a. Mobile terminals 310b, 310c are positioned within this first ROI 360a, mobile terminals 310d, 310e are positioned outside of it.

FIG. 3b shows a scenario example where a temporary high accuracy positioning enhanced area (second RoI 360b) is introduced in addition to the existing first RoI 360a. When a nomadic node 311a, 311b having a coverage area 390a, 390b is introduced, the location server will request for the precise 3D coordinates and antenna/beam settings of these network entities. The same applies if an UE anchor is activated. This information will then be broadcast by the LF BS 330 to all mobile terminals 310d, 310e, 310f, 310g within the second RoI 360b and allows the mobile terminals in the second RoI 360b to exploit the reference points in its surrounding and estimate their position more accurately. Under this circumstance, different PAI are provided to mobile terminals within the existing first RoI 360a and those in the second RoI 360b.

Figure 4:
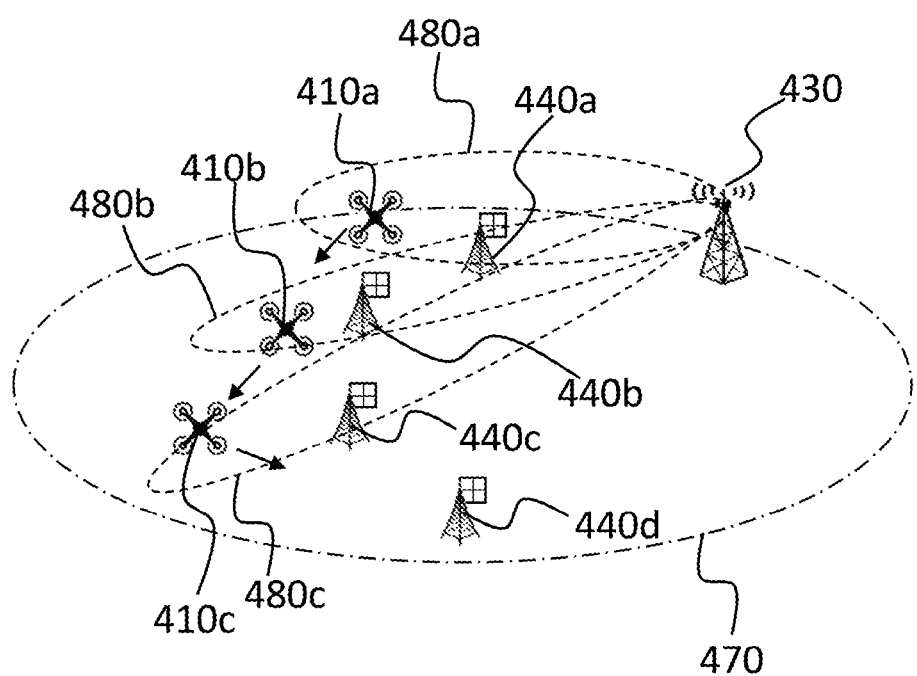
FIG. 4 shows another scenario for determining a position of the mobile terminal with the assistance of the wireless communication system according to an embodiment.

FIG. 4 shows another scenario example for a method for determining a position of the mobile terminal with the assistance of the wireless communication system according to an embodiment, wherein the mobile terminal is moving. Therefore, a PAI transmission strategy for mobility tracking is required. The mobile terminal in this scenario example is attached to a drone. The location server may determine the content and the transmission scheme of the PAI according to the terminal's mobility. Depending on a coarse location, moving direction and velocity of the drone, the location server may determine an updating period of the PAI. The location server may also predict the reference points which the mobile terminal might encounter in the future and include their information in the PAI.

An LF base station 430 having an LF coverage area 470 and four mmW TRPs as reference points 440a, 440b, 440c, 440d are provided. In a first location, the mobile terminal 410a sends a request for PAI. The request for PAI may contain the long-term trajectory of the mobile terminal 410a, including for example a direction of movement, a speed and/or coordinates of its current destination. The location server (not shown in the picture) predicts from drone's estimated moving trajectory or from the transmitted long-term trajectory that the relevant reference point for the PAI to be sent as a response to the request will be the mmW TRP 440b. The base station 430 sends a beam 480a to the mobile terminal 410a in the first location, thereby transmitting PAI including information relating to the reference point 440b. In a similar way, the base station 430 at a later time sends a beam 480b to the mobile terminal 410b which has now moved to a second location, thereby transmitting PAI including information relating to the reference point 440c. Some time later, the base station 430 sends a beam 480c to the mobile terminal 410c which has now moved to a third location, thereby transmitting PAI including information relating to the reference point 440c.

Figure 5A:
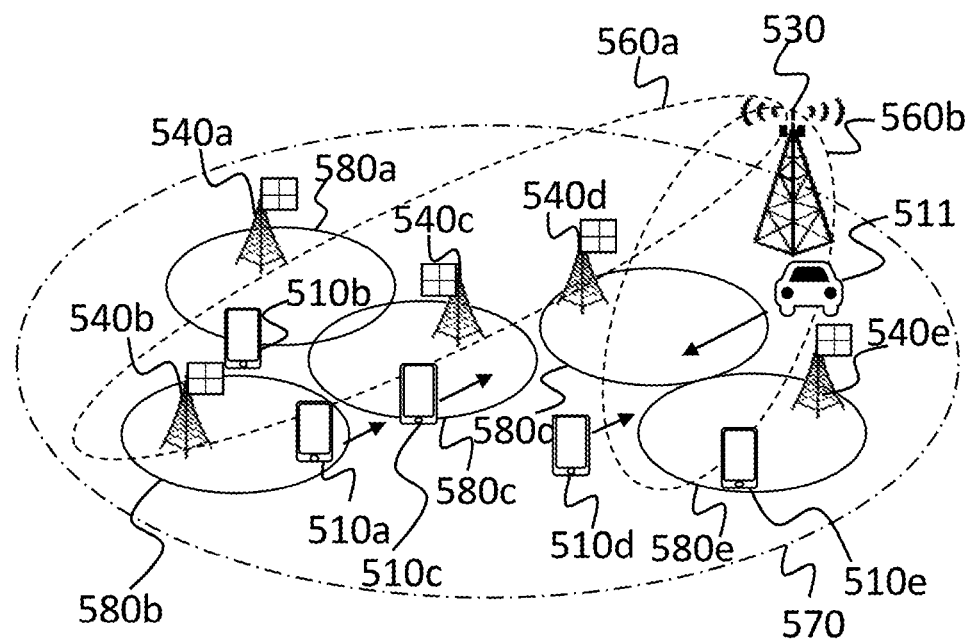
FIGS. 5a and 5b show further scenarios for determining a position of the mobile terminal with the assistance of the wireless communication system according to an embodiment.
Figure 5B:
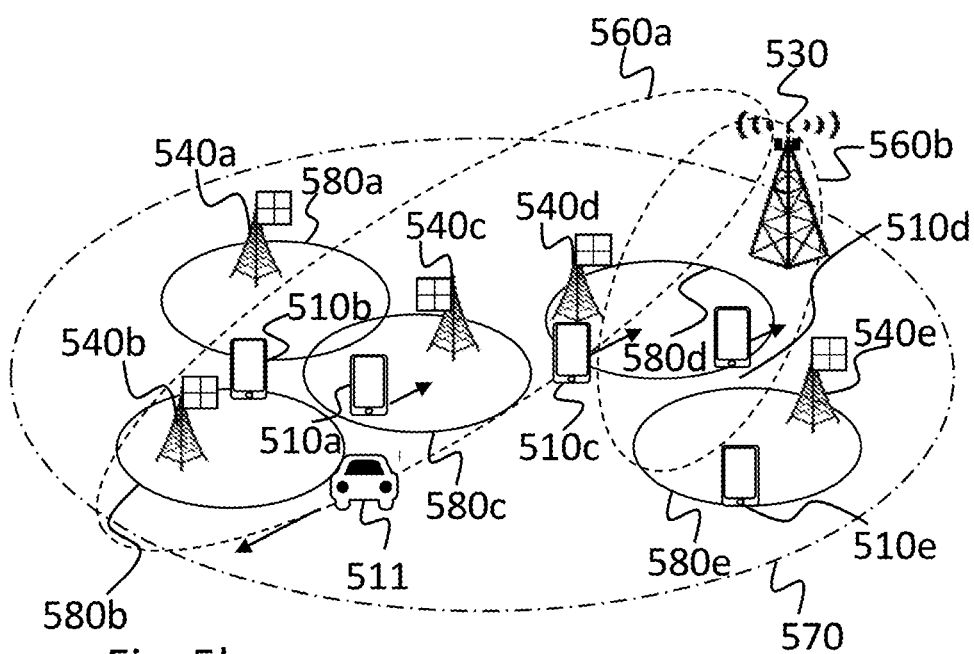

FIGS. 5a and 5b show another scenario example for a method for determining a position of the mobile terminal with the assistance of the wireless communication system according to an embodiment of the invention, wherein the PAI is transmitted by multicasting based on a region of interest (RoI), especially in a dynamic environment wherein the mobile terminals are moving.

When multiple mobile terminals request for high accuracy positioning assistance, PAI can be transmitted to a group of mobile terminals within the RoI by multicasting. For multicast group, the PAI consists of the information on the mmW TRPs required for the particular group of UEs. In case that the distribution of mobile terminals is changed, the multicast grouping as well as the corresponding PAI of interest needs to be updated.

FIG. 5a shows a scenario example at a first time. An LF base station 530 having an LF coverage area 570 and five mmW TRPs as reference points 540a-540e, each having a mmW coverage area 580a-580e, are provided. Further, multiple mobile terminals 510a-510e and a nomadic node 511 are provided.

Depending on their position, the mobile terminals 510a-510e and the nomadic node 511 are grouped into two multicast groups. This may, for example, be performed by the location server (not shown in the figure). A first multicast group comprises the mobile terminals 510a-510c, a second the mobile terminals 510d, 510e and the nomadic node 511. The LF BS 530 sends a first beam 560a, thereby multicasting PAI including information relating to the reference points 540a-540c to the first multicast group, and a second beam 560b, thereby multicasting PAI including information relating to the reference points 540d, 540e to the second multicast group.

FIG. 5b shows the scenario example of FIG. 5a at a later time. Most of the mobile terminals 510a-510e and the nomadic node 511 have changed their position. Therefore, both the content and the transmission scheme of the PAI are changed. The first multicast group now comprises the mobile terminals 510a, 510b and the nomadic node 511. The second multicast group comprises the mobile terminals 510c-510e. The LF BS 530 sends a first beam 580a, thereby multicasting PAI including information relating to the reference points 540a-540c to the first multicast group, and a second beam 580b, thereby multicasting PAI including information relating to the reference points 540d, 540e to the second multicast group. A beam width of the corresponding multicast beams may be adapted according to the positions of the reference points whose PAI is encoded in the beams and the updated RoI of the requesting mobile terminals.

The grouping of the mobile terminals may be signaled to the TRPs which can decide how to beamform the PAI to the corresponding multicast group. Alternatively, the location server may assign TRPs for transmitting the PAIS.

Figure 6A:
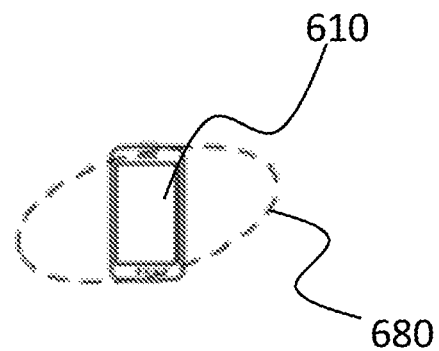
FIGS. 6a and 6b show scenarios for determining a region of interest (RoI) and for signaling according to an embodiment.
Figure 6B:
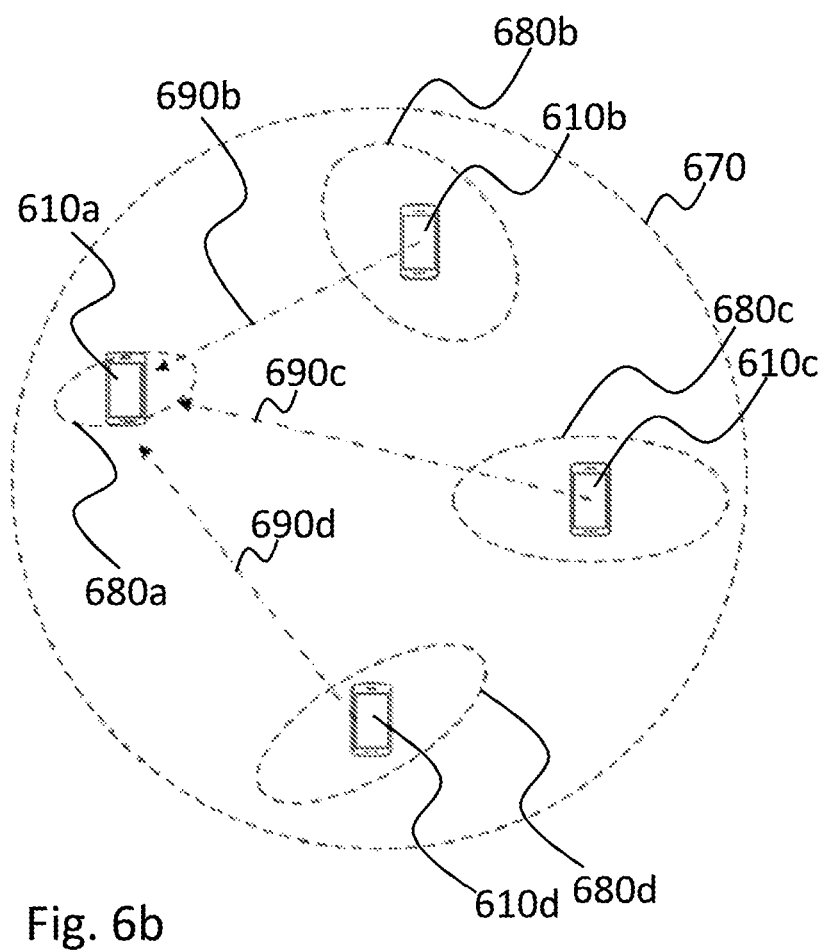

FIGS. 6a and 6b show scenarios for determining a region of interest and signaling according to an embodiment.

In FIG. 6a, a mobile terminal 610 determines its own 2D position without using the reference signal or the positioning assistance information, for example using GNSS. Assuming that the position error distribution is a bi-variate Gaussian, the coarse position 680 is given by an error ellipse that corresponds to the covariance matrix of the 2D positioning estimate of mobile terminal 610. This error ellipse is the RoI that may be signaled to the network in order to receive a beamformed PAI in a unicast.

In FIG. 6b, the Rot is determined for a group of mobile terminals 610a-610d. First, each mobile terminal determines its own coarse position as depicted in FIG. 6a. Thereafter, mobile terminals 610a collects the coarse positions 680b, 380c, 680d of the mobile terminals 610b, 610c, 610d, respectively and generates a RoI 670 covering the coarse positions of itself (680a) and of the other three mobile terminals (680b-680d). The Rot 670 is signaled to the network in order to receive the PAI for the group either in multicast or broadcast fashion. Alternatively, the coarse positions can be sent individually by the respective mobile terminals 610a-610d and the network decides the mobile terminal grouping and the transmission method (unicast, broadcast, multicast) for the PAI for each mobile terminal.

In summary, the present disclosure relates to devices and methods for determining a position of a mobile terminal with assistance from a wireless communication system. The mobile terminal is configured to receive a reference signal from a reference point of the wireless communication system, to receive a positioning assistance information related to the reference point, and to determine a position of the mobile terminal based on the positioning assistance information and the reference signal.

While the present invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. The devices and their components may be embodied as hardware alone, for example as circuits and ASICs, or as a combination of hard- and software, for example a processor executing a program. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A mobile terminal for a wireless communication system, the mobile terminal comprising:
   at least one processor, wherein the at least one processor is configured to execute a computer program stored in a memory so as to perform a method comprising:
   receiving a reference signal transmitted by a reference point of the wireless communication system;
   receiving positioning assistance information related to the reference point, the positioning assistance information comprising antenna configuration information of the reference point and geometry-related information of the reference point, the antenna configuration information comprising a beam configuration, and the beam configuration comprising a beam identifier-to-angle of departure mapping;
   determining angle-related information of the reference signal based on the received antenna configuration information and based on a measurement related to angle of departure and/or a measurement related to angle of arrival of the reference signal;
   calculating, based on the geometry-related information of the reference point and the determined angle-related information of the reference signal, a position of the mobile terminal;
   determining a coarse position of the mobile terminal without the positioning assistance information and the reference signal; and
   providing information, for sending to the wireless communication system, about the coarse position of the mobile terminal;
   wherein the positioning assistance information is determined based on the coarse position of the mobile terminal,
   wherein a region of interest (ROI) is determined based on the coarse position of the mobile terminal,
   wherein the positioning assistance information is determined based on the ROI, and
   wherein the ROI is based on a distance of the mobile terminal to at least one further mobile terminal.

2. The mobile terminal according to claim 1, wherein the antenna configuration information further includes an antenna orientation and/or calibration and/or installation errors of the reference point.

3. The mobile terminal according to claim 1, wherein the geometry-related information includes a height and/or global coordinates of the reference point.

4. The mobile terminal according to claim 1, wherein the positioning assistance information further comprises scheduling-related information including transmission sub-frames and/or update periodicity and/or resource mappings.

5. The mobile terminal according to claim 1, wherein the positioning assistance information is received from the wireless communication system or from a location server.

6. The mobile terminal according to claim 1, the method further comprising requesting the positioning assistance information from the wireless communication system or from a location server.

7. The mobile terminal according to claim 1, the method further comprising, after determining the coarse position of the mobile terminal, providing a request, to be sent to the wireless communication system, for the positioning assistance information, wherein the request includes the coarse position of the mobile terminal.

8. A method, comprising:
receiving a reference signal transmitted by a reference point of a wireless communication system;
receiving positioning assistance information related to the reference point, the positioning assistance information comprising antenna configuration information of the reference point and geometry-related information of the reference point, the antenna configuration information comprising a beam configuration, and the beam configuration comprising a beam identifier-to-angle of departure mapping;
determining angle-related information of the reference signal based on the received antenna configuration information and based on a measurement related to angle of departure and/or a measurement related to angle of arrival of the reference signal;
calculating, based on the geometry-related information of the reference point and the determined angle-related information of the reference signal, a position of a mobile terminal;
determining a coarse position of the mobile terminal without the positioning assistance information and the reference signal; and
providing information, for sending to the wireless communication system, about the coarse position of the mobile terminal,
wherein a region of interest (ROI) is determined based on the coarse position of the mobile terminal,
wherein the positioning assistance information is determined based on the ROI, and
wherein the ROI is based on a distance of the mobile terminal to at least one further mobile terminal.

9. The method according to claim 8, wherein the antenna configuration information further includes an antenna orientation and/or calibration and/or installation errors of the reference point.

10. The method according to claim 8, wherein the geometry-related information includes a height and/or global coordinates of the reference point.

11. The method according to claim 8, wherein the positioning assistance information further comprises scheduling-related information including transmission sub-frames and/or update periodicity and/or resource mappings.

12. The method according to claim 8, wherein the positioning assistance information is received from the wireless communication system or from a location server.

13. The method according to claim 8, the method further comprising:
requesting the positioning assistance information from the wireless communication system or from a location server.

14. The method according to claim 8, the method further comprising:
after determining the coarse position of the mobile terminal, providing a request, to be sent to the wireless communication system, for the positioning assistance information, wherein the request includes the coarse position of the mobile terminal.

15. A non-transitory computer-readable storage medium, where the computer-readable storage medium stores computer program which, when executed by a computer, causes the computer to carry out operations comprising:
receiving a reference signal transmitted by a reference point of a wireless communication system;
receiving positioning assistance information related to the reference point, the positioning assistance information comprising antenna configuration information of the reference point and geometry-related information of the reference point, the antenna configuration information comprising a beam configuration, and the beam configuration comprising a beam identifier-to-angle of departure mapping;
determining angle-related information of the reference signal based on the received antenna configuration information and based on a measurement related to angle of departure and/or a measurement related to angle of arrival of the reference signal;
calculating, based on the geometry-related information of the reference point and the determined angle-related information of the reference signal, a position of a mobile terminal;
determining a coarse position of the mobile terminal without the positioning assistance information and the reference signal; and
providing information, for sending to the wireless communication system, about the coarse position of the mobile terminal,
wherein a region of interest (ROI) is determined based on the coarse position of the mobile terminal,
wherein the positioning assistance information is determined based on the ROI, and
wherein the ROI is based on a distance of the mobile terminal to at least one further mobile terminal.

16. The non-transitory computer-readable storage medium according to claim 15, wherein the antenna configuration information further includes an antenna orientation and/or calibration and/or installation errors of the reference point.

17. The non-transitory computer-readable storage medium according to claim 15, wherein the geometry-related information includes a height and/or global coordinates of the reference point.

18. The non-transitory computer-readable storage medium according to claim 15, wherein the positioning assistance information further comprises scheduling-related information including transmission sub-frames and/or update periodicity and/or resource mappings.

* * * * *